Jan. 20, 1959     H. J. McDEVITT     2,869,724
DEVICE FOR DEMINERALIZING WATER
Filed June 29, 1955
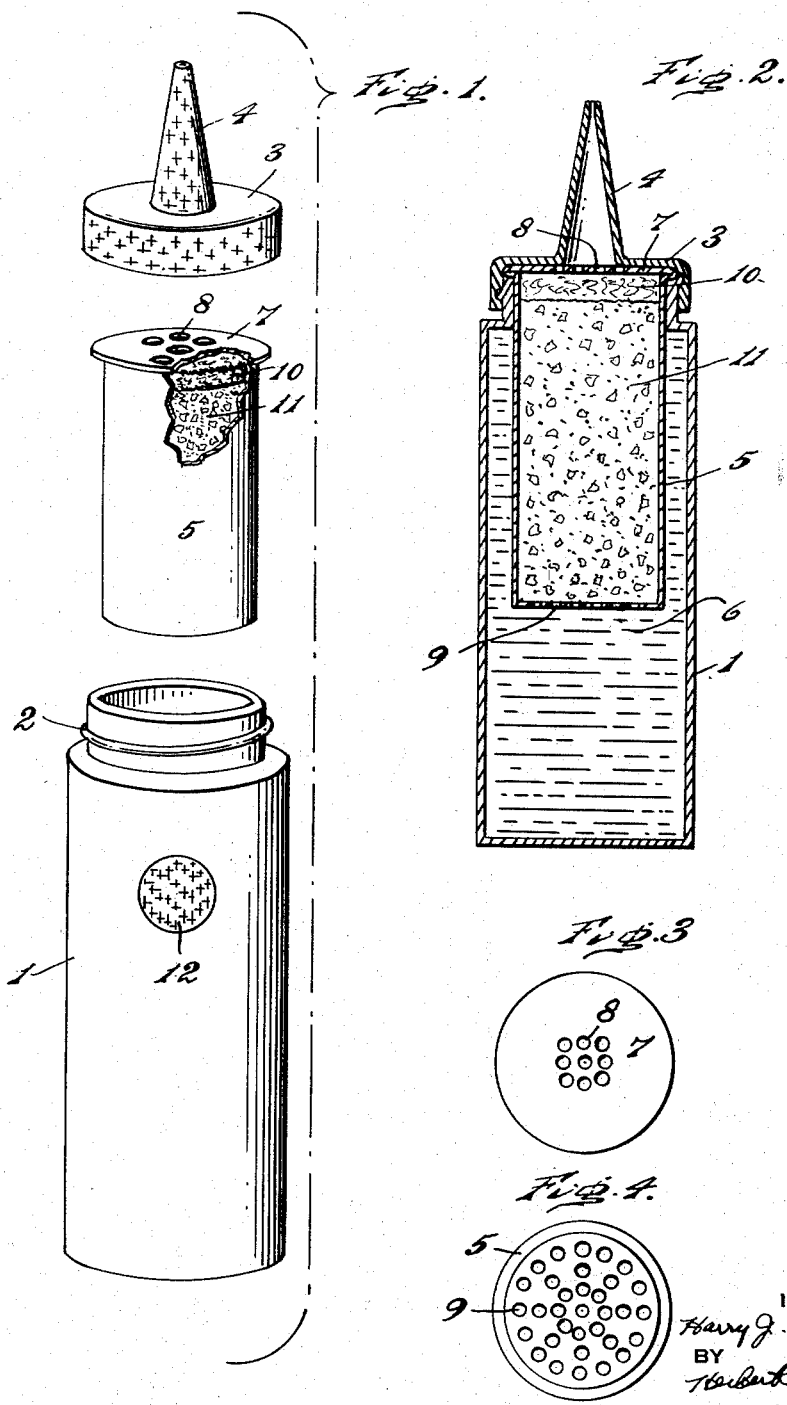
INVENTOR
Harry J. McDevitt
BY
Herbert P. Fairbanks
ATTORNEY

United States Patent Office 2,869,724
Patented Jan. 20, 1959

2,869,724
DEVICE FOR DEMINERALIZING WATER
Harry J. McDevitt, Hatboro, Pa.
Application June 29, 1955, Serial No. 518,913
2 Claims. (Cl. 210—94)

The object of this invention is to devise a novel water demineralizing and filtering device for treatment of water used in storage batteries.

It is a well known fact that many types of the natural water contains impurities which are injurious to water used in storage batteries.

A further object is to devise a novel device for the purposes stated having a compressible plastic container to receive the water, and having a novel cartridge suspended in the container and containing a cation exchanger coupled with a basic anion, said cartridge having an apertured top and bottom and a filter beneath the top apertures.

With the foregoing and other objects in view as will hereinafter clearly appear, my invention comprehends a novel device for demineralizing and filtering water for storage batteries.

For the purpose of illustrating the invention, I have shown in the accompanying drawings a preferred embodiment of it which I have found in practice will give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein set forth.

Figure 1 is an exploded view of a device for demineralizing and filtering water for storage batteries.

Figure 2 is a sectional elevation.

Figure 3 is a top plan view of the cartridge.

Figure 4 is a bottom plan view of the cartridge.

Similar numerals of reference indicate corresponding parts.

Referring to the drawings:

A container 1, preferably of plastic and compressible and flexible, has a closed bottom, an open top and closed sides, and having at the top a threaded neck of reduced diameter as at 2. The top is closed by an internally threaded cap 3 having a dispensing spout 4. A novel cartridge 5 is suspended in the water 6 and its top 7 is of greater diameter than its body portion to form an annular flange supported on the top of the container and sealed in position by the cap 3. The top 7 has apertures 8 and the bottom has apertures 9. The cartridge contains a mixture of a cation exchanger and a basic anion and between such mixture and the cartridge top is a filter 10, the demineralizing mixture being indicated at 11. A color mark 12 on the container indicates that the cartridge should be replaced when the dissolved solid content of the effluent water assumes the same color as the mark 12.

The cartridge is designed to incorporate a given maximum filtering area permitting sufficient voids or space for storage of contaminated materials for a balanced cartridge. The density of resins employed results in removal of particle sizes down to five microns. The filter contains all necessary components to properly demineralize water by removing all contamination detrimental to storage battery operation.

Having thus described my invention, what I claim as new and desire to secure by Letters Patent is:

1. A device for demineralizing and filtering water for storage batteries, comprising a compressible, plastic container having a closed bottom, closed side walls and a neck of reduced diameter at its upper end, such upper end being open, a cartridge the upper end of which has a close fit in said neck and containing a mixture of a cation exchanger coupled with a basic anion, said cartridge having closed side walls, an apertured top and an apertured bottom with a filter between said mixture and the top of the cartridge, the top of said cartridge being of greater diameter than its side walls to form an annular flange supported on the upper end of said neck, and a cap in threaded engagement with said neck and having a dispensing spout.

2. The construction defined in claim 1, having in addition a color marker on the outer face of said container the color of which is indicative of cartridge replacement when the solid contents of the effluent water is the same color as that of said color marker.

References Cited in the file of this patent

UNITED STATES PATENTS

| | | |
|---|---|---|
| 2,207,294 | Hubner et al. | July 9, 1940 |
| 2,525,497 | Monfried | Oct. 10, 1950 |
| 2,695,268 | Wright | Nov. 23, 1954 |
| 2,751,081 | La Motte | June 19, 1956 |
| 2,761,833 | Ward | Sept. 4, 1956 |
| 2,781,312 | Klumd et al. | Feb. 12, 1957 |

OTHER REFERENCES

Self-Indicating Amberlite for Monobed Deionization, published by Rohm and Haas Co., Washington Square, Philadelphia 5, Pa., three pages, page 1 is cited.